United States Patent Office 3,049,406
Patented Aug. 14, 1962

3,049,406
PREPARATION OF ANHYDROUS LITHIUM SALTS
Louis R. Grant and Moddie D. Taylor, Washington, D.C., assignors to Callery Chemical Company, Pittsburgh, Pa., a corporation of Pennsylvania
No Drawing. Filed May 12, 1955, Ser. No. 507,999
7 Claims. (Cl. 23—89)

This invention relates in general to the preparation of anhydrous lithium salts and more particularly it relates to a new and improved method for preparing anhydrous lithium halides and pseudohalides.

Interest in reactions in non-aqueous media is increasing quite rapidly. Such reactions require compounds that have appreciable solubility in non-aqueous solvents. Anhydrous metal halides are among the most useful compounds for this purpose, but are difficult to obtain in an anhydrous state. These compounds are usually not conveniently prepared from their hydrated forms because they tend to become more basic during the process of dehydration. Other methods of preparation include the direct reaction of the metal with a halogen or the action of an ammonium halide on the metal oxide at elevated temperatures. The direct method is inconvenient because the metal is often not available while the method employing a halide and metal oxide is a reaction between solids at elevated temperatures which seldom goes quantitatively to completion and results in an impure product. It would, therefore, be highly desirable if a method could be developed which could be carried out in solution at room temperature and produce a pure anhydrous metal halide or pseudohalide.

It is an object of this invention to provide a new and useful method for preparing anhydrous lithium salts which is simple and economical to carry out.

Another object is to provide a new and improved method for preparing lithium halides and pseudohalides which is carried out in a non-aqueous solvent at room temperature.

Other objects will become apparent as the invention is more fully disclosed hereinafter.

This new and improved method for preparing anhydrous lithium salts will be completely described hereinafter and the novelty thereof will be particularly pointed out and distinctly claimed.

This invention is based upon the discovery that anhydrous lithium halides and pseudohalides (cyanides, thiocyanates, etc.) can be prepared in quantitative yields by the reaction of lithium hydride with a halogen or pseudohalogen (cyanogen, thiocyanogen) in ether solution. An excess of hydride is used which can be readily filtered away from the lithium halide or pseudohalide dissolved in the ether. Upon evaporation of the ether, pure anhydrous lithium halide or pseudohalide is obtained.

In one experiment, lithium iodide was prepared according to the equation:

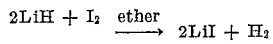

The following procedure was used. In a 500 ml. 3-necked flask provided with a stirrer and dropping funnel was placed a mixture of 19.0 g. (0.075 mol) of iodine and 1.36 g. (0.17 mol) of lithium hydride. To this mixture with stirring was added small increments of ether because the reaction was quite vigorous initially. Hydrogen was evolved until about 100 ml. of ether had been added. An additional 150 ml. of ether was then added and the mixture was refluxed for one hour. After filtering, the ether was removed from the filtrate leaving a white salt which was vacuum dried for one hour at 30°–35° C. The yield of lithium iodide was 19.7 g. or 98% of theory. Chemical analysis for iodide and lithium indicated a purity of 99%. The product is quite sensitive to moisture and air and if not properly protected from the atmosphere it assumes a yellowish tint which eventually becomes dark brown.

Other experiments showed that this method may be used to prepare any lithium halide or pseudohalide using tetrahydrofuran or pyridine as a solvent. However, when lithium fluoride is prepared, equipment must be used which is resistant to fluorine and hydrogen fluoride. This method is generally applicable for the preparation of lithium pseudohalides such as lithium cyanide and lithium thiocyanate by the reaction of lithium hydride with cyanogen or thiocyanogen in ether solution.

In accordance with the patent statutes, we have explained the principles and mode of operation of this invention and described what we now consider to be its best embodiment. It should therefore be understood that within the scope of the appended claims, this invention may be practiced otherwise than as specifically described.

What we claim and desire to secure by Letters Patent of the United States is:

1. A method of preparing anhydrous lithium salts of the class consisting of lithium halides and lithium pseudohalides which comprises reacting lithium hydride with a material selected from the class consisting of halogens and pseudohalogens at about room temperature in an inert anhydrous non-aqueous solvent in which the lithium salt is soluble and selected from the group consisting of ether, tetrahydrofuran and pyridine and recovering the lithium salt thus formed.

2. A method according to claim 1 in which the solvent is ether.

3. A method according to claim 1 in which the solvent is tetrahydrofuran.

4. A method according to claim 1 in which a slight stoichiometric excess of lithium hydride is used according to the equation: $2LiH + X_2 \rightarrow LiX + H_2$ in which X is selected from the class consisting of halogens and pseudohalogens.

5. A method according to claim 4 in which the excess lithium hydride is separated from the lithium salt solution and the lithium salt is recovered by evaporation of the solvent.

6. A method of preparing anhydrous lithium halide which comprises reacting lithium hydride and a halogen at about room temperature in an inert anhydrous non-aqueous solvent in which the resulting lithium halide is soluble and selected from the group consisting of ether, tetrahydrofuran and pyridine, and recovering the lithium salt thus formed.

7. A method according to claim 6 in which said solvent is ether and said halogen is iodine.

References Cited in the file of this patent

Gibb Jr.: "Compounds of Hydrogen With Metals and Metalloids," reprinted from Journal of the Electro-Chemical Society, vol. 93, No. 5, pages 199–211, May 1948.

"Introductory Information on Lithium Hydride," article (CX–SE Form 2), 2 pages, published by Lithaloys Corp., N.Y.C., and released on or about January 1, 1946.

J. W. Mellor's "A Comprehensive Treatise on Inorganic and Theoretical Chem.," vol. 2, 1922 Ed., page 483, Longmans, Green & Co., N.Y.